(12) United States Patent
Wilde et al.

(10) Patent No.: US 10,019,427 B2
(45) Date of Patent: Jul. 10, 2018

(54) MANAGING COMMENTS FOR COLLABORATIVE EDITING OF ELECTRONIC DOCUMENTS

(71) Applicant: Microsoft Technology Licensing, LLC, Redmond, WA (US)

(72) Inventors: Benjamin Wilde, Quincy, MA (US); Erin O'Connell, North Reading, MA (US); Patrick Gan, Salem, MA (US); Douglas Milvaney, Cambridge, MA (US); Joan Weaver, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 15/061,905

(22) Filed: Mar. 4, 2016

(65) Prior Publication Data

US 2017/0255604 A1   Sep. 7, 2017

(51) Int. Cl.

| G06F 3/048 | (2013.01) |
| G06F 17/24 | (2006.01) |
| G06F 3/0481 | (2013.01) |
| G06F 3/0484 | (2013.01) |
| H04L 29/08 | (2006.01) |
| G06Q 10/10 | (2012.01) |

(52) U.S. Cl.
CPC ........ *G06F 17/241* (2013.01); *G06F 3/0481* (2013.01); *G06F 3/0484* (2013.01); *G06Q 10/101* (2013.01); *G06Q 10/103* (2013.01); *H04L 67/1097* (2013.01)

(58) Field of Classification Search
CPC ...................................................... G06F 3/048
See application file for complete search history.

(56) References Cited

U.S. PATENT DOCUMENTS

| 5,671,428 A | 9/1997 | Muranaga et al. |
| 7,818,678 B2 | 10/2010 | Massand |
| 7,950,064 B2 | 5/2011 | Chavez et al. |
| 8,108,464 B1 | 1/2012 | Rochelle et al. |

(Continued)

OTHER PUBLICATIONS

Parker, Sarah, "Google Doc Resolving:Responding to Comments", Published on: Mar. 9, 2015 Available at: https://www.youtube.com/watch?v=kEH5Ifn_3W4.

(Continued)

*Primary Examiner* — Peiyong Weng
(74) *Attorney, Agent, or Firm* — Patent GC LLC

(57) ABSTRACT

An end user application running on a local client computer stores activity data and comment data for an electronic document. Activity data includes data indicative of actions taken by users and associated with the electronic document, such as actions with respect to the electronic document itself, and actions with respect to comments, such as adding a comment and marking a comment as resolved. A displayed comment or comment thread can be marked as resolved in response to a user action. A corresponding action is stored in the activity data. Activity data can be displayed while the electronic document is open in the end user application. An action of resolving a comment can be accessed in the displayed activity data. In response to receiving an input associated with a displayed action of resolving a comment, the comment can be marked as unresolved.

20 Claims, 9 Drawing Sheets

(56) References Cited

U.S. PATENT DOCUMENTS

| | | |
|---|---|---|
| 8,291,014 B2 | 10/2012 | Cierniak et al. |
| 8,938,679 B1 | 1/2015 | Hsu et al. |
| 8,996,985 B1 | 3/2015 | Johnston et al. |
| 2006/0282762 A1 | 12/2006 | Diamond et al. |
| 2009/0249224 A1 | 10/2009 | Davis et al. |
| 2010/0095198 A1 | 4/2010 | Bultrowicz et al. |
| 2010/0235763 A1* | 9/2010 | Massand ............. G06F 17/2229 715/753 |
| 2014/0032633 A1 | 1/2014 | Kleppner |
| 2014/0082525 A1 | 3/2014 | Kass et al. |
| 2014/0136950 A1 | 5/2014 | Wo et al. |

OTHER PUBLICATIONS

"JIRA 6.4 Users Guide (excerpts)", Retrieved from the Internet «https://web.archive.org/web/20150530083857/https://confluence.atlassian.com/display/JIRA064/JIRA+User's+Guide», May 30, 2015, 14 Pages.

"International Search Report and Written Opinion Issued in PCT Application No. PCT/US2017/019573", dated May 18, 2017, 9 Pages.

\* cited by examiner

MANAGING COMMENTS FOR COLLABORATIVE EDITING OF ELECTRONIC DOCUMENTS

BACKGROUND

The availability of shared storage systems for electronic documents has increased the ability of computer end users to share and to collaborate in the creation of a variety of electronic documents. End users can cause electronic documents to be stored in shared storage systems on a computer network, such as the internet. End users can instruct such a shared storage system to allow electronic documents to be shared with other end users of the shared storage system. A shared storage system generally has an access control component in a file system that tracks, for each electronic document, the access rights that different end users have for the electronic document.

After an electronic document has been shared among two or more end users, the shared storage system manages access to the shared electronic document to ensure consistency of the electronic document, especially in the case of collaborative editing of, i.e., collaborative modifications to, the electronic document. A collaboration system manages collaborative modification by tracking which end users currently are using end user applications on client computers to access the same electronic document. The collaboration system typically is implemented as one or more computer programs executing on the server computer, and, in some implementations, may have components executing on the client computers.

An end user application running on a computer, for the purpose of modifying electronic documents, typically is configured to allow an editor to associate a comment with a location within the electronic document. Any single editor may add multiple comments to an electronic document. When the electronic document is shared, such comments can originate from multiple editors using multiple end user applications. As an electronic document has a larger number of comments from a larger number of users, management of the comments becomes increasingly complex.

SUMMARY

This Summary is provided to introduce a selection of concepts in a simplified form that are further described below in the Detailed Description. This Summary is intended neither to identify key or essential features, nor to limit the scope, of the claimed subject matter.

To manage complexity related to having multiple comments from multiple editors associated with an electronic document, an end user application running on a local client computer is configured to store a collection of activity data and a collection of comment data for the electronic document. The comment data includes data representing a plurality of comment threads. The activity data includes data indicative of actions taken by users and associated with the electronic document, including but not limited to actions with respect to the electronic document itself, such as opening, saving, closing or sharing the electronic document, and actions with respect to comments, such as adding, editing or deleting a comment, replying to a comment and marking a comment as resolved.

The comment data can be processed so as to display unresolved comments and comment threads in the context of the electronic document while the electronic document is open in the end user application. A displayed comment or comment thread can be marked as resolved in response to a user action, for which a corresponding action is stored in the activity data.

The activity data can be processed so as to display actions related to the electronic document while the electronic document is open in the end user application. An action of resolving a comment can be accessed in the displayed activity data. In response to receiving an input associated with a displayed action of resolving a comment, the comment can be marked as unresolved.

By tracking actions with respect to comments in activity data for an electronic document, such actions can be presented to users in the context of other actions. The presentation of such consolidated activity data in the graphical user interface also provides a single location for a user to be informed of actions taken by other users since the last time the user accessed the document. In addition, by tracking resolution of a comment as an action in activity data for an electronic document, displays of comments for the electronic document can be simplified while still providing a way to quickly identify and access resolved comments. A resolved comments may be accessed by identifying a corresponding action in the activity data indicating that the comment was resolved. The action of resolving a comment also can be viewed in the context of other actions taken with respect to the electronic document. After an action related to resolving a comment is identified, a variety of operations can be performed on the corresponding comment, such as allowing a user to mark the comment as unresolved.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
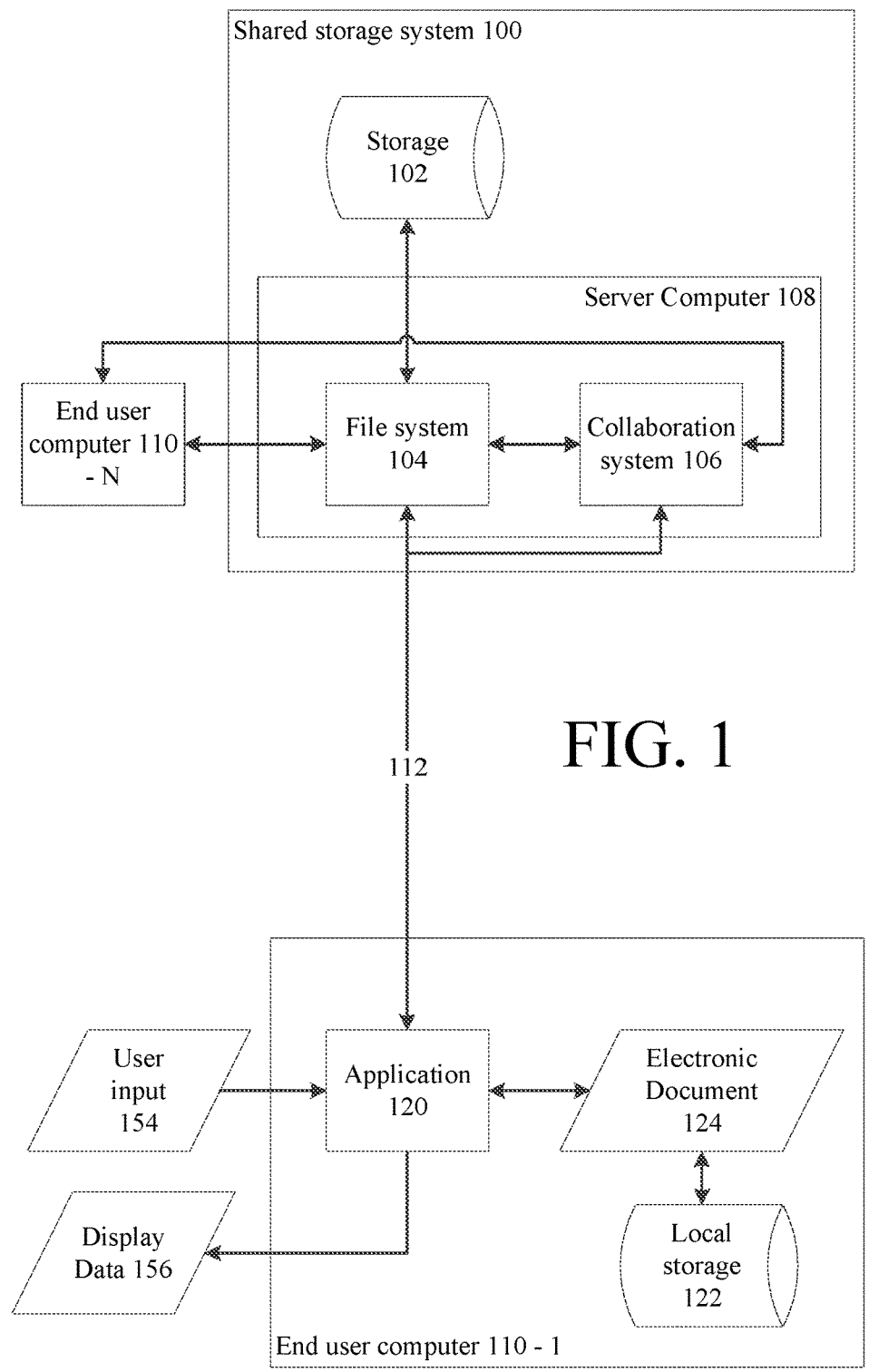
FIG. 1 is a block diagram of an example computer system configured to support collaborative editing of electronic documents through end user applications on multiple client computers.

FIG. 1 is a block diagram of an example computer system configured to support collaborative editing of electronic documents by multiple end users through end user applications on multiple client computers.

A computer system that is configured to support sharing and collaborative modification of electronic documents through multiple end user applications includes a shared storage system 100. The shared storage system 100 generally includes storage 102 in which data is stored in data files accessible through a file system 104 that is part of the shared storage system. The file system configures a server computer 108 to maintain information about each file stored in storage 102. The shared storage system 100 can be implemented using one or more general purpose computers, such as described in connection with FIG. 9, and configured to implement one or more server computers. The shared storage system 100 is responsive to requests over a computer network 112 to access, through the file system 104, files on the storage 102.

Multiple end user computers 110-1 to 110-N, also called client computers herein, are connected to the shared storage system for communication over one or more computer networks 112, such as the internet or a private computer network. An end user computer 110 can be a computer such as described in connection with FIG. 9, and configured as a client computer running one or more applications 120. Examples of such a computer include, but are not limited to, a tablet computer, a slate computer, a notebook computer, a desktop computer, a virtual desktop computer hosted on a server computer, a handheld computer, and a mobile phone including a computer and applications.

The computer network 112 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

An end user computer 110 includes one or more applications 120. In this context, an application is a computer program executed on the end user computer that configures the computer to be responsive to user input 154 to allow an end user to interactively modify an electronic document 124. An electronic document can include any kind of data, such as text, still images, video, or audio and combinations of these, and generally has data defining structure of the electronic document and data defining content of the electronic document within the defined structure. The application processes the electronic document in response to user input received from input devices. For example, the application combines data to create the structure and content of the electronic document. The application also displays or otherwise presents display data 156, such as a graphical user interface including the content according to the structure of the electronic document, through output devices (not shown) to the end user. The application also stores the electronic document in memory and/or in a data file in local storage of the end user computer and/or in the shared storage.

A variety of kinds of applications can be used on an end user computer. Examples of an application include, but are not limited to, a word processing application, a presentation application, a note taking application, a text editing application, a paint application, an image editing application, a spreadsheet application, a desktop publishing application, a drawing application, a video editing application, and an audio editing application. An end user application can permit a variety of operations on an electronic document, such as, but not limited to, viewing and commenting without content editing, viewing and content editing, or viewing only.

An application generates an electronic document that is stored in a data file. Such a data file can be stored in local storage 122 and/or the shared storage system 100. The electronic document, while being modified by an end user on the end user computer, also is temporarily stored in memory on the end user computer. The application also may temporarily store the electronic document in a cache on local storage before committing changes to the electronic document to the data file.

For an electronic document stored in a data file in a shared storage system 100, the file system 104 of the shared storage system can include information indicating a sharing state of the electronic document. Such information can be in the form of access controls indicating which end users are authorized to access the electronic document. The file system also can be configured to be responsive to a query to provide this information to another application, such as application 120 on an end user computer. The shared storage system can provide information to an application on an end user computer about the sharing state of an electronic document, and permit modification to that sharing state, in a number of ways.

In some implementations, electronic documents can be shared by users by distributing a copy of the electronic document through various distribution channels among multiple users. Each user can modify the electronic document, possibly adding comments to the electronic document, and then can share the modified electronic document with additional users.

In some implementations, the electronic document is stored in a data file in the shared storage system 100, and the data file is shared, with modification rights, with at least one more end user. In such a case, two or more end user applications on two or more client computers can access and can attempt to modify the electronic document through the shared storage system 100. To handle such a condition, the shared storage system can include a collaboration system 106. The collaboration system 106 is a computer program that configures the server computer to manage contemporaneous access to shared electronic documents in the shared storage system 100. The collaboration system 106 is configured to store information about end user applications, and associated end users, that currently are accessing the electronic document.

Using the information about end user applications and end users currently accessing an electronic document, the collaboration system can implement any of a number of different techniques for coordinating access to the electronic document to ensure consistency of the electronic document. For example, the collaboration system can prevent one end user application from causing modifications to be written to a data file for an electronic document while another the data file is open for writing by another end user application. As another example, the collaboration system can interactively merge changes to the electronic document as such changes are being made collaboratively through multiple end user applications. In such a case, as an example, the collaboration system can merge changes received from end user computers in memory local to the collaboration system, and then can transmit a modified version of the electronic document to each end user computer with an application currently accessing the document. Such modifications can include changes to the structure and/or content of the electronic document, changes to comment data associated with the electronic document, and/or updates to activity data associated with the electronic document.

The data representing an electronic document can be stored in computer storage in a number of different formats. On the one hand, there can be a file format for one or more data files for storing data for an electronic document in persistent storage. On the other hand, there can be one or more data structures stored in memory for providing access to the data for the electronic document by an end user application during editing or viewing of the electronic document. The file format can be and typically is different from the data structure that is stored in memory, yet both store essentially the same data.

Figure 2:
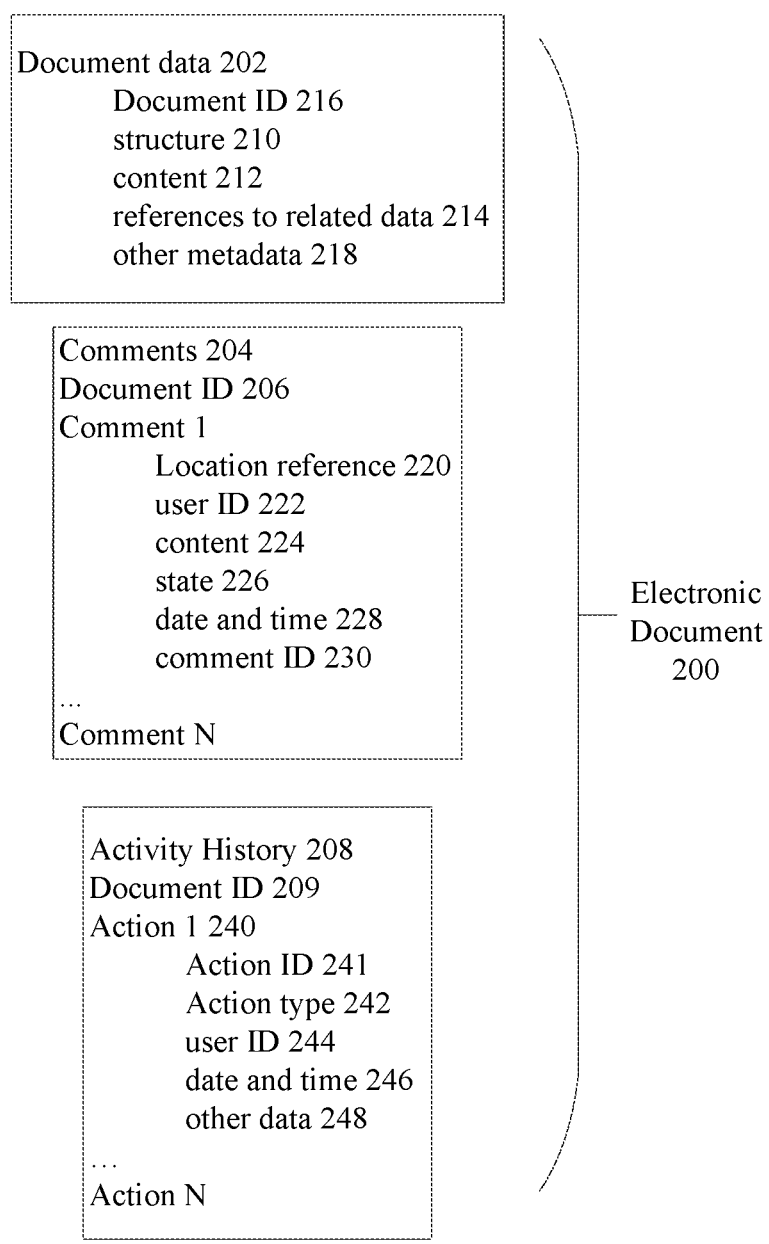
FIG. 2 is a diagram illustrating data structures for storing comment data and activity data for an electronic document.

Referring now to FIG. 2, in general, and whether in a data file in persistent storage or data structure in memory, the data 200 for the electronic document includes data representing structure and content of the document 202 and structure and content of comments 204. To assist in managing the complexity of multiple comments from multiple users, the data for an electronic document also includes activity data 208 associated with the electronic document.

With respect to an example file format, in one implementation, the data for the document 202 and data for the comments 204 can be stored in one data file, and data for the activity data 208 can be stored in a separate second data file. In another implementation, the data for the document 202, data for the comments 204, and data for the activity data 208 all can be stored in a single data file. In another implementation, the data for the document 202, data for the comments 204, and data for the activity data 208 each can be stored in separate data files. When such data is read by an end user application, the end user application may generate corresponding data structures in memory, which in turn are processed and stored into the data files at periodic intervals and/or in response to an instruction received from an end user.

Generally speaking, the data 202 for the electronic document includes a document identifier 216, data defining the structure 210 of the electronic document, and data defining the content 212 within that structure of the electronic document. There is a wide variety of formats for electronic documents, including various markup languages, such as the hypertext markup language (HTML), standard generalized markup language (SGML), extensible markup language (XML), as well as proprietary document formats. The invention is not limited to any particular format for the structure and content of the electronic document. The data for an electronic document may include references to other data related to the electronic document 214, such as files storing comment data, activity data, style sheets for formatting the document, templates, macros and the like. The data for an electronic document also may include various metadata 218 about the electronic document.

Comment data 204 defining a collection of comments can include a document identifier 206 indicating the electronic document to which the collection of comments is related. The comment data can include, for each comment, a reference 220 to a location within the electronic document, a user identifier 222 of the end user that added the comment, and content 224 of the comment, which is typically text but is not limited to text. The reference 220 to a location in a document can be, for example, an offset within the electronic document, such as an offset within the content associated with a structural element of the electronic document. The user identifier can be any indication of a user, such as an email address, user name, etc., such as the user name for the user to access the shared storage system that stores the electronic document. State information 226 also can be associated with a comment, such as data indicating whether the comment has been resolved. A comment also can have an associated date and time stamp 228 indicating when the comment was added to the electronic document. The comment can have a comment identifier 230 that distinguishes the comment from other comments associated with the electronic document.

Comments can be threaded, such that a comment refers to another comment, perhaps in the form of a reply. There are a variety of ways to implement comment threading, such as using the reference 220 of a first comment to refer to a comment identifier 230 of another comment, or using a linked list to represent a comment and any reply comments associated with it.

Activity data 208 defining a collection of actions associated with an electronic document can include a document identifier 209 indicating the electronic document to which the collection of actions is related. The activity data can include, for each action 240, an action identifier 241, data indicating a type of action 242, a user identifier 244 of the end user associated with the action, and a date and time stamp 246 indicating when the action occurred. As in the comment data, the user identifier can be any indication of a user, such as an email address, user name, etc., such as the user name for the user to access the shared storage system that stores the electronic document. Other data 248, such as text or other information, can be stored as part of the data describing the action 240. For example, for an action that marks a comment as resolved, a comment identifier for the comment can be stored.

The activity data can represent a variety of different kinds of actions performed by users and associated with the electronic document. Particular actions with respect to comments include adding a comment, editing a comment, deleting a comment, replying to a comment and resolving a comment. Other actions with respect to an electronic document can include, but are not limited to, opening the electronic document, saving the electronic document, closing the electronic document, sharing the electronic document, and so on. Notably, the activity data for an electronic document can be updated by multiple different end user applications as well as the shared storage system. The shared storage system can track actions that are not visible to the end user application, such as instructions to share a document with other users, or other changes in permissions, or other actions taken on data files for the electronic documents through the file system by other users or applications.

Figure 3:
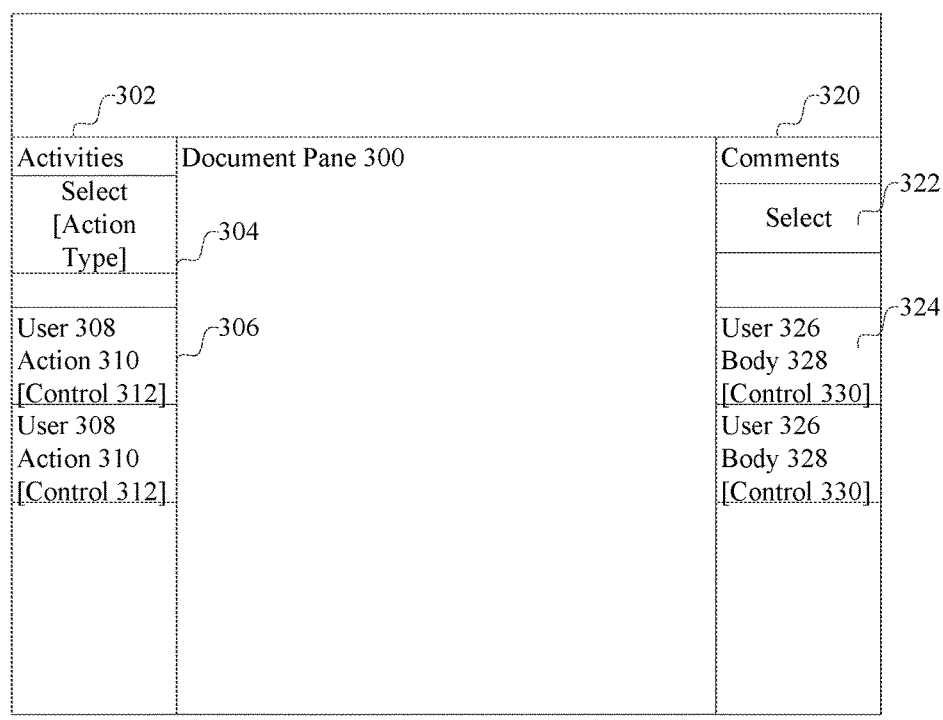
FIG. 3 is an illustration of an example graphical user interface for displaying comment data and activity data on an end user application.

In FIG. 3, an example graphical user interface for an end user application is shown. In this example graphical user interface, a document pane 300 is a primary display area in which the electronic document is presented on a display. The end user computer receives user inputs through one or more input devices, and can associate such inputs with operations with respect to the electronic document in document pane 300, or with respect to other graphical elements in the graphical user interface. The end user computer processes some user inputs to effect modifications to the structure and/or content of the electronic document currently being accessed in the document pane 300.

The graphical user interface for the end user application can include an activity pane 302 in which the end user application displays one or more actions associated with the electronic document. In response to user input, various settings can be provided that control the display of the activity data. For example, the activity pane can include a selection element 304. In response to user inputs with respect to the selection element, the end user application displays actions from the activity data for the electronic document currently presented in the document pane 300. For example, the selection element 304 can provide a mechanism through which the end user application receives inputs specifying how any displayed actions are searched, filtered, sorted, and/or viewed in the activity pane 302. In response to selection of this control, one or more user interface elements can be used to provide for user input of a variety of settings.

In the activity pane, an action is displayed by generating a graphical representation 306 of the action including an indication 308 of the user that performed the action, which can include a name, user name and/or picture of the user, and a body 310 of the action, which is typically text, but can include other data describing the action as well as other visual appearance parameters related to the action. This graphical representation 306 of an action can be generated using a variety of data accessible through the data for the action. For example, the user identifier can be used to access profile information of the user from the shared storage system. A comment identifier can be used to access data from the comment thread associated with a resolved comment.

Given one or more displayed actions in the activity pane, the end user application is configured to be responsive to user input associated with the activity pane to select one or more actions, and to be responsive to user input with respect to a selected one or more actions. For example, the system can be responsive to user input associated with an action in the activity pane related to a resolved comment, to mark the comment as unresolved by setting the value associated with the resolved comment to indicate the comment is unresolved. A corresponding action also can be added to the activity data indicating that the user has marked the comment as unresolved.

For example, graphical elements in the graphical representation of the action can include one or more controls 312, such as buttons, that allow an end user to provide input with respect to a displayed action. For example, for an action that indicates a comment was resolved, a button can be provided to mark the comment as unresolved. In response to a user manipulating that control, the comment can be marked unresolved and a corresponding action can be added to the activity data.

The activity pane can be programmed to support a wide variety of operations on activity data. For example, the actions can be filtered and/or sorted based on a user, action type, keyword and/or date, or other data, and then displayed in the activity pane. A user of the application can specify how the actions displayed in the activity pane should be filtered and/or sorted. In response to such a specification, the application generates the corresponding display of actions. A scroll bar (not shown) can be provided in the activity pane to allow scrolling of the displayed actions. When the activity pane is displayed, the activity pane also can include a closing element (not shown). Manipulation of the closing element in response to user input results in the end user application closing the activity pane.

With respect to comments, actions related to a comment, such as adding a comment, editing a comment, deleting a comment, resolving a comment and/or replying to a comment, can be actions for which data is stored as an action performed by a user and associated with the electronic document. Thus, using various filtering and sorting operations on the activity data, a user can locate, for example, all comments added by an individual, or all resolved comments, and so on. A graphical user interface also can be responsive to user input with respect to such a displayed action to display the related comment in context with the content of the document.

The graphical user interface for the end user application can include a comments pane 320 in which the end user application displays one or more comments associated with the electronic document. In response to user input, various settings can be provided that control the display of the comment data. For example, the comments pane can include a selection element 322. In response to user inputs with respect to the selection element, the end user application displays comments for the electronic document currently presented in the document pane 300. For example, the selection element 322 can provide a mechanism through which the end user application receives inputs specifying how comments are viewed in the comments pane 320. For example, the end user application can have a setting for indicating whether all comments are shown or whether only open comments are shown, and whether all comments in a thread are shown or whether only the first comment is shown, or other display settings related to possible states of each comment.

Generally speaking, the data displayed in the comments pane is a representation of the collection of comments, typically starting with a first comment associated with any currently displayed portion of the document. This display can be interactively updated based on a current cursor position in the document or a currently displayed portion of the document. Generally speaking, and as described in more detail below in connection with FIG. 4, the comments shown are only those that have a status of "unresolved", unless a display setting is set otherwise to show all comments. The comment view also can have a scroll bar. In response to manipulation of the scroll bar, different portions of a list of comments can be viewed. The invention is not limited to any particular kind of display of the comment data. The display of the comment data also can be integrated with the display of the structure and content of the electronic document in the document pane.

In the comments pane, a comment is displayed by generating a graphical representation 324 of the comment including an indication 326 of the user that created the comment, which can include a name, user name and/or picture of the user, and the body 328 of the comment, which is typically text but can include other data, as well as other visual appearance parameters related to the comment. This graphical representation 324 of a comment can be generated using a variety of data accessible through the data for the comment. For example, the user identifier can be used to access profile information of the user from the shared storage system.

Given one or more displayed comments, the end user application is configured to be responsive to user input associated with the comments to select one or more comments, and to be responsive to user input with respect to a selected one or more comments. For example, the end user application can be responsive to user input associated with a comment to mark the comment as resolved, by setting the value associated with the comment to indicate the comment is resolved. A corresponding action also can be added to the activity data indicating that the user has marked the comment as resolved.

For example, other graphical elements in the graphical representation of the comment can include one or more controls 330, such as buttons, that allow an end user to provide input with respect to a displayed comment, such as an input to edit the comment, delete the comment, reply to the comment, mark the comment as resolved, show or hide the thread related to the comment, and so on. In response to manipulating such a control, the corresponding action can be taken, such as marking a comment as resolved.

In the example shown in FIG. 3, the end user application presents the activity pane and the comments pane in the context of the currently accessed electronic document. In particular, in this example, the document pane 300, activity pane 302 and comments pane 320 are displayed in the graphical user interface simultaneously. In this example in FIG. 3, the interfaces are illustrated as panes of the graphical user interface which are non-overlapping and non-modal with the other panes of the interface. The activity pane and comments pane also can be implemented using other graphical user interface techniques. A modal dialog box, a call-out interface, or small pop-up window also are examples of a kind of interface that can be shown in the context of the currently accessed electronic document.

Figure 4:
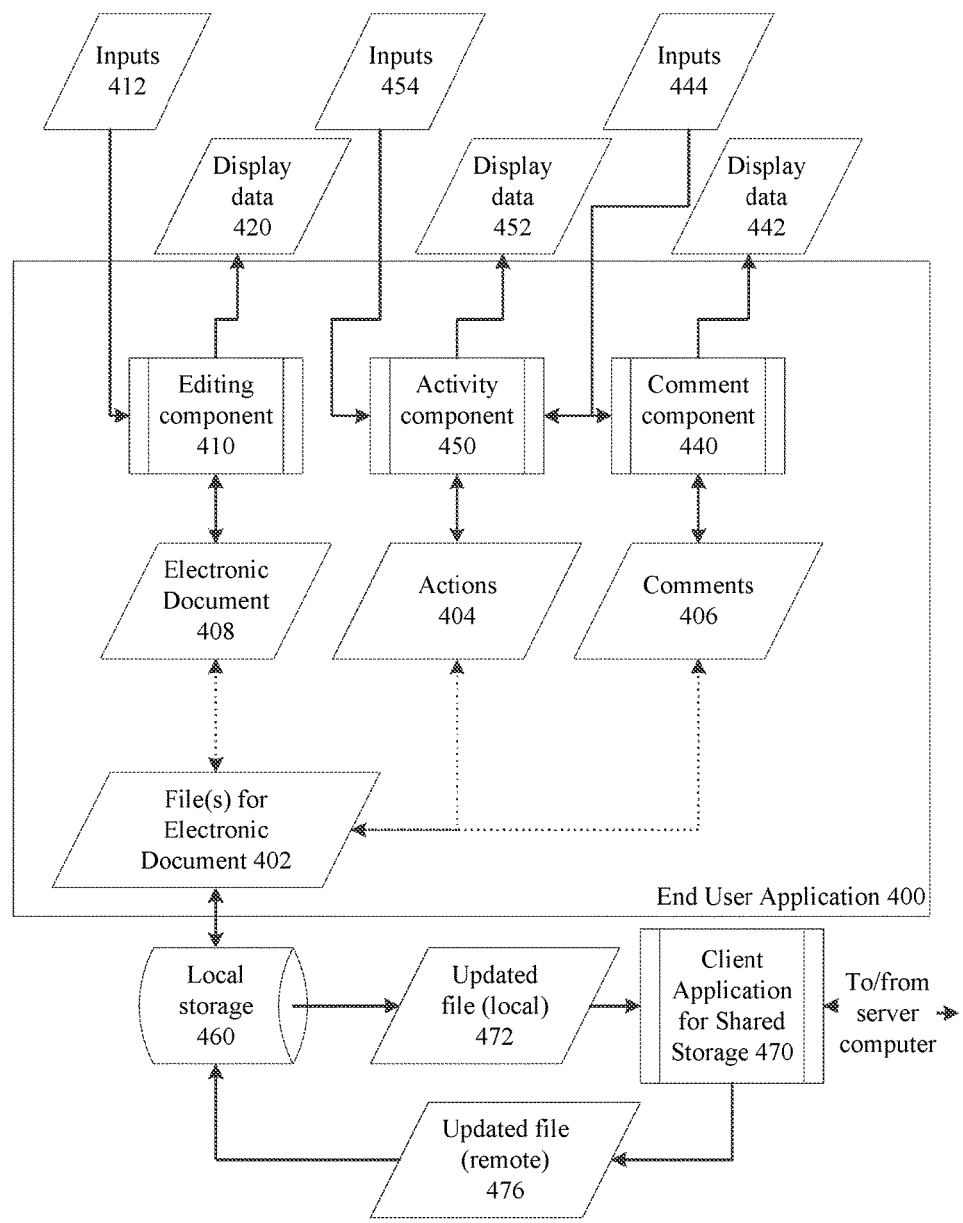
FIG. 4 is a data flow diagram of an example client computer configured to edit documents with comments.

FIG. 4 is a data flow diagram of an example implementation of an end user application 400, running on a client computer, which includes a comment pane and an activity pane such as shown in FIG. 3. More details of an example implementation of the operation of the system in FIG. 4 are provided by the flow charts of FIGS. 5 through 8. It should be understood that the implementation as described in connection with FIGS. 3 through 8 is merely an example implementation and that a wide variety of other implementations are possible. The end user application 400 has an input to receive one or more files 402 defining the electronic document. The end user application generates, in memory, representations of a collection of actions 404 and a collection of comments 406 based on the received one or more files.

The files 402 may be received from local storage 460 and/or from a shared storage system (such as 100 in FIG. 1). In many shared storage systems, the files in local storage 460 are synchronized with copies of the files on a server computer in the shared storage system. For example, the end user computer can include a client application 470 for shared storage that periodically transmits an updated file 472 of the electronic document from the local storage 460 to the server computer. The server computer then transmits a copy of the electronic document received from one client computer to the other client computers that are using that electronic document. The client application 470 for the shared storage receives an updated file 476 of the electronic document from the server computer, and then updates the copy in local storage 460.

The end user application also processes the structure and content of the electronic document into memory to generate a representation of the electronic document 408, which is edited through an editing component 410. The editing component has inputs to receive user and system inputs 412 involved in the editing and storing of the electronic document, and outputs to provide display data 420 representing the electronic document being edited, and outputs to provide a modified electronic document back to storage as a file 402 upon saving. The end user application displays the display data 420 through a graphical user interface, which can include one or more displays and/or other output devices.

A comment component 440 manages interaction with the collection of comments 406. For example, the comment component generates display data 442 for a comment pane to be displayed in the graphical user interface 416 using the collection of comments 406, as described in more detail in connection with FIG. 5 below. Also, the comment component is responsive to user actions 444, such as adding a comment, deleting a comment, editing a comment, replying to a comment and resolving a comment, to update the data in the collection of comments 406. The comment component also can interactively update the display of the comments in response to updates to the data in the collection of comments. For example, the comments component is responsive to an input marking a selected comment as resolved, so as to update the data in the collection of comments to mark the comment as resolved, update the comments display, and instruct the activity component to add an action to the collection of actions indicating that the user marked the comment as resolved. Such a process is described in more detail below in connection with FIG. 7.

An activity component 450 manages interaction with the collection of actions 404. For example, the activity component generates display data 452 for an activity pane to be displayed in the graphical user interface using the collection of actions 404, as described in more detail in connection with FIG. 6 below. Also, the activity component is responsive to user actions 454 with respect to the document, such as opening the electronic document, saving the electronic document, as well as other actions 444 related to comments, to update the data in the collection of actions. The activity component 450 also is responsive to user input with respect to displayed actions from the collection of actions. For example, the activity component is responsive to an input indicating that a displayed action representing a resolved comment is to be marked as unresolved, which in turn instructs the comment component to update the data in the collection of comments and update the comments pane. Such a process is described in more detail below in connection with FIG. 8.

Figure 5:
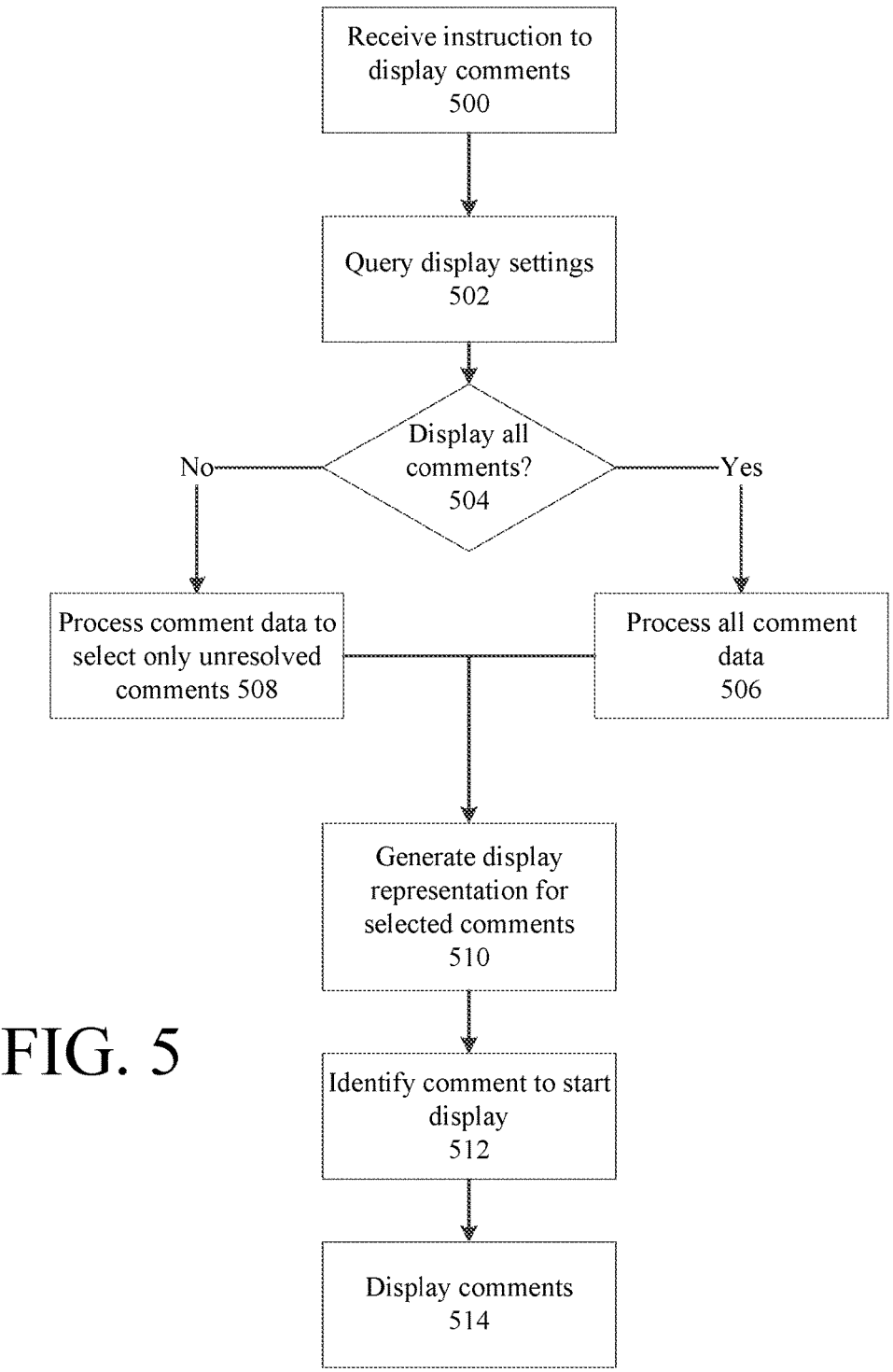
FIG. 5 is a flow chart describing an example implementation of an operation for generating and displaying a comments pane.

Turning now to FIG. 5, a flowchart describing an example implementation of an operation for generating and displaying a comments pane will now be described. This operation is described in the context of a collection of comments associated with a document and displayed in a comment pane such as in FIG. 3. This implementation is merely an example; there are other ways in which a collection of comments can be displayed in association with an electronic document.

The end user application receives 500 an instruction to display the comments. The end user application queries 502 display settings for the comment pane. Such display settings can include any of a variety of settings, such as whether all comments in a thread should be displayed and whether all comments should be displayed, and formatting information for displaying the comments, such as font type and size, color, backgrounds, and the like. As shown in FIG. 5, the end user application can consider, for example, the setting of whether comments marked as resolved should be displayed, when selecting comments for display.

If all comments should be displayed, as determined at 504, the end user application processes 506 the comment data so as to select and sort all comments in order by their corresponding positions in the electronic document, and by order within any comment thread. Otherwise, if only unresolved comments should be displayed, as determined at 504, the end user application processes 508 the comment data so as to select and sort only unresolved comments in order by their corresponding positions in the electronic document, and by order within any comment thread.

For each comment to be displayed, the end user application can generate 510 a display representation of the comment. The display representation of a comment can include, among other things, a control for marking the comment as resolved. The end user application then can identify 512 a comment, among those to be displayed, which corresponds to the currently displayed portion of the electronic document. Display 512 of the comments can begin with the identified comment.

Figure 6:
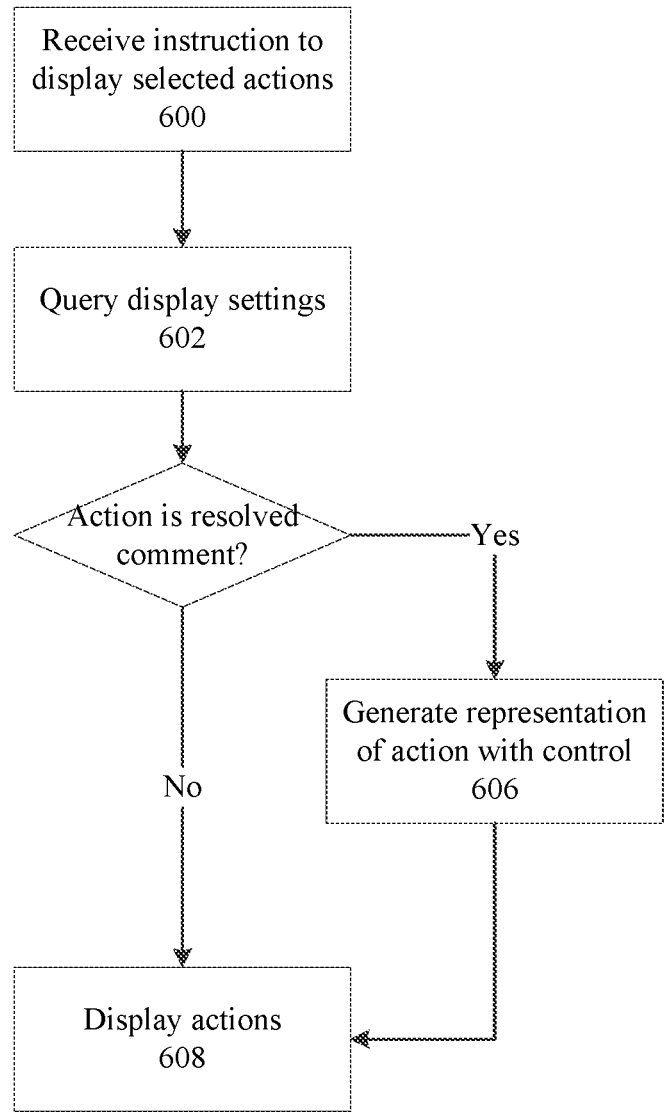
FIG. 6 is a flow chart describing an example implementation of an operation for generating and displaying an activity pane.

FIG. 6 is a flowchart describing an example implementation of an operation for generating and displaying an activity pane. This operation is described in the context of a collection of actions associated with a document and displayed in an activity pane such as in FIG. 3. This implementation is merely an example; there are other ways in which a collection of actions can be displayed in association with an electronic document.

The end user application receives 600 an instruction to display the actions from the activity data in the activity pane. The end user application queries 602 display settings for the activity pane. Such display settings can include any of a variety of settings, such as which actions to display, and how to sort the selected actions for display, and formatting information for displaying the actions, such as font type and size, color, backgrounds, and the like. As shown in FIG. 6, the end user application can select, for example, viewing actions that include resolving a comment.

If an action to be displayed includes resolving a comment, as determined at 604, the displayed representation of the action is generated 606 so as to include a control for marking the comment as unresolved. The generated representations of the selected actions are then displayed 608. The actions to be displayed can be displayed in any selected order, such as chronological, or by order with respect to any associated location in the document, or by order with respect to the end user that performed the action, and so on.

Figure 7:
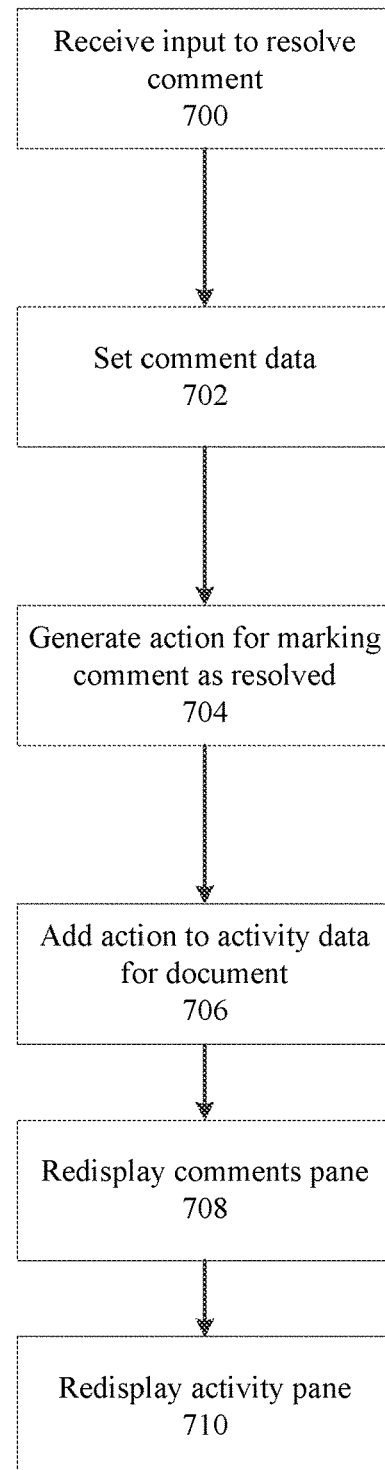
FIG. 7 is a flow chart describing an example implementation in which a sequence of operations results in a comment being marked as resolved.

FIG. 7 is a flowchart describing an example implementation in which a sequence of operations results in a comment being marked as resolved. A comment can be marked resolved in the comment pane. The end user application receives 700 an input with respect to a displayed comment indicating that the comment should be marked as resolved. For example, an end user may manipulate a control displayed on the comment for marking the comment as resolved. In response to the input to mark a selected comment as resolved, the end user application sets 702 data, within the comment data for the selected comment, to mark the comment as resolved. The end user application also generates 704 data representing an action indicating that this comment has been marked as resolved. The data for the action of resolving the selected comment is added 706 to the activity data for this electronic document. The data for this action may be gathered from the comment itself, as well as the electronic document and information about the current user that is editing the electronic document. In some implementations, and under some conditions, the comment pane can be redisplayed 708, so as to remove the resolved comment from the display. Similarly, in some implementations, and under some conditions, the activity pane can be redisplayed 710, so as to show the action indicating that the selected comment was resolved.

Figure 8:
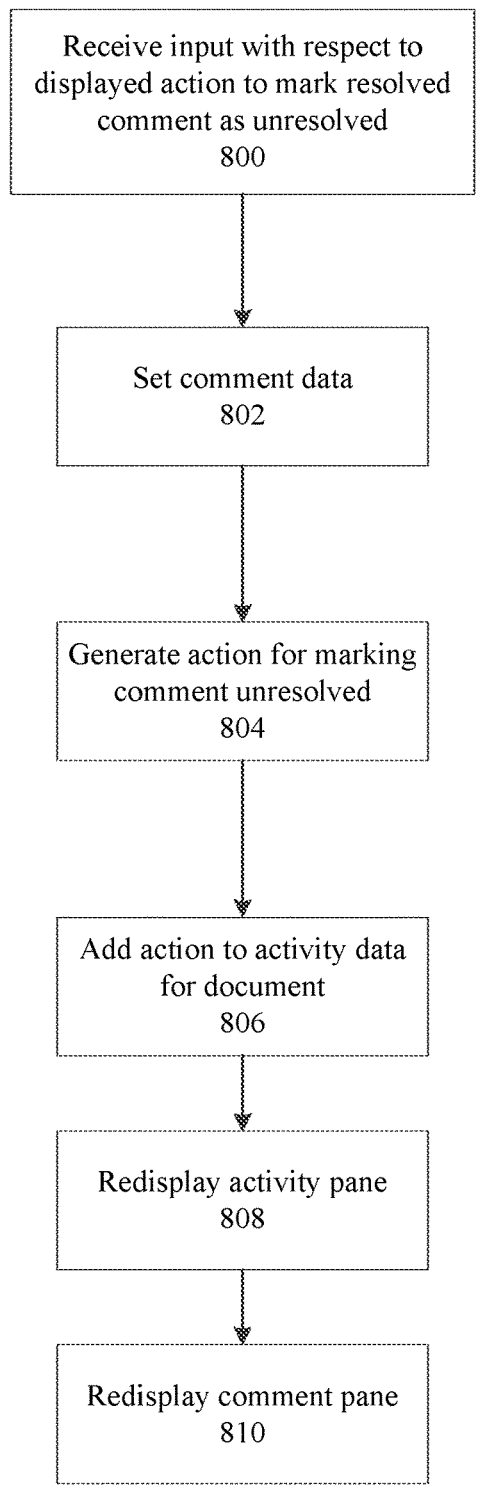
FIG. 8 is a flow chart describing an example implementation in which a sequence of operations results in a resolved comment being marked as not resolved.

FIG. 8 is a flowchart describing an example implementation in which a sequence of operations results in a resolved comment being marked as not resolved. A resolved comment can be identified in the activity pane and then marked as unresolved. The end user application receives 800 an input with respect to a displayed action in the activity pane indicating that a corresponding resolved comment should be marked as unresolved. For example, an end user may manipulate a control displayed on a "resolved comment" action to mark the comment as unresolved. In response to the input to mark a selected comment as unresolved, the end user application sets 802 data, within the comment data for the selected comment, to mark the comment as resolved. The end user application can generate 804 data for an action indicating that this comment has now been marked as unresolved. The data for this action of marking a previously resolved comment as unresolved is added 806 to the activity data for this electronic document. The data for this action can be gathered from the original action, as well as the electronic document and information about the current user that is editing the electronic document. Alternatively, the original action of marking the comment as resolved can be deleted from the activity data. In some implementations, and under some conditions, the activity pane can be redisplayed 808, so as to remove the original action from the display or to show the action indicating that the previously resolved comment is now unresolved. In some implementations, and under some conditions, the comment pane can be redisplayed 810, so as to add the comment and/or comment thread as an unresolved comment back into the comment pane.

By tracking resolution of a comment as an action in the activity data for an electronic document, displays of comments for the electronic document can be simplified while still providing a way to quickly identify and access resolved comments. A resolved comments may be accessed by identifying a corresponding action in the activity data indicating that the comment was resolved. The action of resolving a comment also can be viewed in the context of other actions taken with respect to the electronic document. After an action related to resolving a comment is identified, a variety of operations can be performed on the corresponding comment, such as allowing a user to mark the comment as unresolved.

Figure 9:
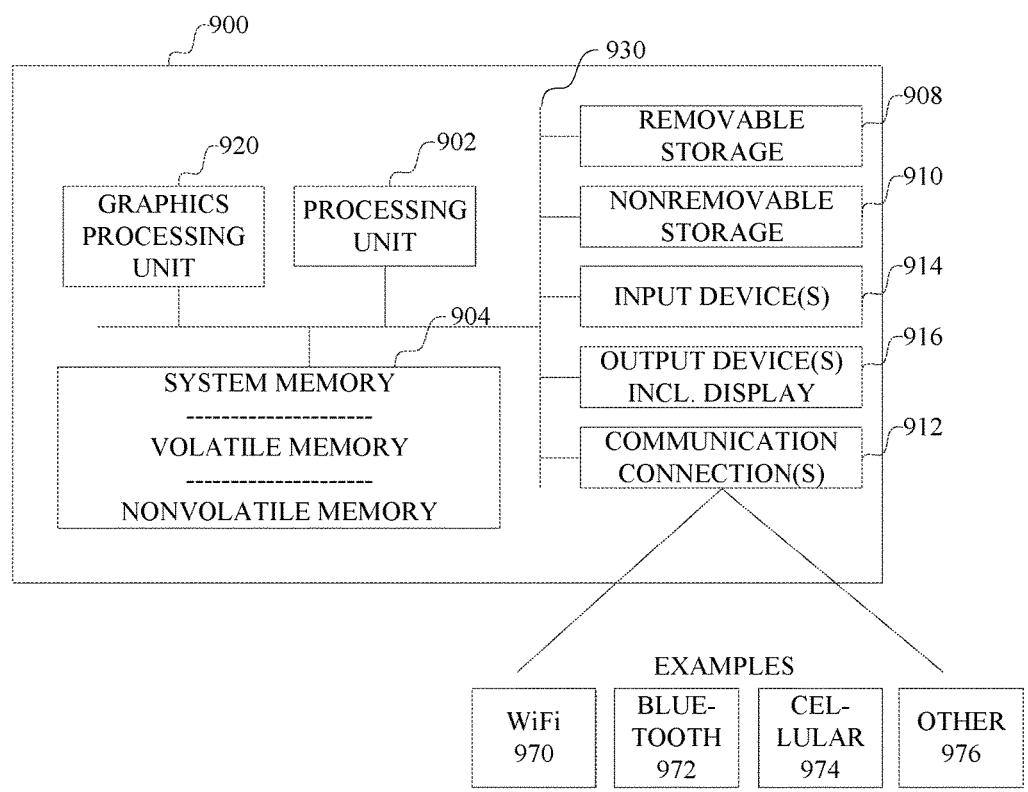
FIG. 9 is a block diagram of an example computer.

Having now described an example implementation, FIG. 9 illustrates an example of a computer with which such techniques can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 9, a computer 900 includes at least one processing unit 902 and memory 904. The computer can have multiple processing units 902 and multiple devices implementing the memory 904. A processing unit 902 can include one or more processing cores (not shown) that operate independently of each other. Additional co-processing units also can be present in the computer. The memory 904 may include volatile devices (such as dynamic random access memory (DRAM) or other random access memory device), and non-volatile devices (such as a read-only memory, flash memory, and the like) or some combination of the two. Other storage, such as dedicated memory or registers, also can be present in the one or more processors. The computer 900 can include additional storage, such as storage devices (whether removable or non-removable) including, but not limited to, magnetically-recorded or optically-recorded disks or tape. Such additional storage is illustrated in FIG. 9 by removable storage device 908 and non-removable storage device 910. The various components in FIG. 9 are generally interconnected by an interconnection mechanism, such as one or more buses 930.

A computer storage medium is any medium in which data can be stored in and retrieved from addressable physical storage locations by the computer. A computer storage medium thus can be a volatile or nonvolatile memory, or a removable or non-removable storage device. Memory 904, removable storage 908 and non-removable storage 910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 900 may also include communications connection(s) 912 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 912 are devices, such as a wired network interface, wireless network interface, radio frequency transceiver, e.g., WiFi 970, cellular 974, long term evolution (LTE) or Bluetooth 972, etc., transceivers, navigation transceivers, e.g., global positioning system (GPS) or Global Navigation Satellite System (GLONASS), etc., or other devices 976 that interface with communication media to transmit data over and receive data from the communication media.

The computer 900 may have various input device(s) 914 such as a pointer device, keyboard, touch-based input device, pen, camera, microphone, sensors, such as accelerometers, thermometers, light sensors and the like, and so on. The computer 900 may have various output device(s) 916 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 910, communication connections 912, output devices 916 and input devices 914 can be integrated within a housing with the rest of the computer, or can be connected through various input/output interface devices on the computer, in which case the reference numbers 910, 912, 914 and 916 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 9.

The various modules and data structures of FIGS. 1-4, the flowcharts of FIGS. 5-8, as well as any operating system, file system and applications on a computer in FIG. 9, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer, configured as a local client computer, includes a computer comprises a network interface configured to connect the computer to a computer network. The computer network is connected to a shared storage system. The shared storage system comprises a file system configured to store a plurality of electronic documents and to make the plurality of electronic documents available to a plurality of users. The computer comprises a processing system that includes one or more processing units and storage, the storage comprising computer program code that, when executed by the processing system, configures the processing system. The processing system, as configured by the computer program code, comprises an application configured to process user input to modify an electronic document. The application comprises a graphical user interface including a document pane configured to display the electronic document, and comments displayed in association with the electronic document. Comments have values indicative of a state of the comment. The graphical user interface also displays actions in association with the electronic document. The actions are from activity data associated with the electronic document. The application is further configured to, in response to an input associated with a displayed comment, mark the comment as resolved, by setting the value associated with the comment to indicate the comment is resolved and by adding an action to the activity data associated with the electronic document to indicate the comment is resolved. The application is further configured to, in response to an input associated with a displayed action related to a resolved comment, mark the comment as unresolved by setting the value associated with the resolved comment to indicate the comment is unresolved.

In another aspect, a computer-implemented process comprises processing user input to modify an electronic document, including presenting a graphical user interface including a document pane configured to display the electronic document and including displayed comments associated with the electronic document, wherein comments have values indicative of a state of the comment, and including displayed actions from activity data associated with the electronic document. In response to an input associated with a displayed comment, the comment is marked as resolved by setting the value associated with the comment to indicate the comment is resolved and by adding an action to the activity data associated with the electronic document to indicate the comment is resolved. In response to an input associated with a displayed action related to a resolved comment, the comment is marked as unresolved by setting the value associated with the resolved comment to indicate the comment is unresolved.

In another aspect, a computer system comprises a shared storage system and a client computer. The client computer includes an application with a graphical user interface including a document pane configured to display the electronic document, and comments displayed in association with the electronic document. Comments have values indicative of a state of the comment. The graphical user interface also displays actions in association with the electronic document. The actions are from activity data associated with the electronic document. The application includes means, operative in response to an input associated with a displayed comment, for marking the comment as resolved. The application also includes means, operative in response to an input associated with a displayed action related to a resolved comment, for marking the comment as unresolved. To mark a comment as resolved, the application can set the value associated with the comment to indicate the comment is resolved and add an action to the activity data associated with the electronic document to indicate the comment is resolved. To mark a resolved comment as unresolved, the application can set the value associated with the resolved comment to indicate the comment is unresolved.

In another aspect, a shared storage system stores data for an electronic document, including comments displayed in association with the electronic document. Comments have values indicative of a state of the comment. The graphical user interface also displays actions in association with the electronic document. The actions are from activity data associated with the electronic document. The shared storage system can include means responsive to actions with respect to an electronic document through a file system to add actions to activity data associated with the electronic document.

In another aspect, an application on a computer includes means, operative in response to an input associated with a displayed comment, for marking the comment as resolved. The application also includes means, operative in response to an input associated with a displayed action related to a resolved comment, for marking the comment as unresolved. To mark a comment as resolved, the application can set the value associated with the comment to indicate the comment is resolved and add an action to the activity data associated with the electronic document to indicate the comment is resolved. To mark a resolved comment as unresolved, the application can set the value associated with the resolved comment to indicate the comment is unresolved.

In any of the foregoing aspects, an electronic document comprises data defining structure and content of the electronic document, data defining comments associated with the electronic document, and actions associated with the electronic document.

In any of the foregoing aspects, the actions can include data describing actions performed by users and associated with the electronic document.

In any of the foregoing aspects, the actions can include actions with respect to the electronic document. Such actions can include, but are not limited to, opening, saving or closing a document, sharing the document, and changing permissions of the document.

In any of the foregoing aspects, the actions can include actions with respect to comments in the electronic document. Such actions can include, but are not limited to, adding, editing or deleting a comment, replying to a comment, marking a comment as resolved, and marking a comment as unresolved.

In any of the foregoing aspects, the actions can be displayed in an activity pane associated with the document pane in the graphical user interface.

In any of the foregoing aspects, the comments can be displayed in a comment pane associated with the document pane in the graphical user interface.

In any of the foregoing aspects, the activity pane, comment pane and document pane can be nonoverlapping panes in the graphical user interface.

In any of the foregoing aspects, the application is configured to display only unresolved comments.

In any of the foregoing aspects, the application is configured to, in response to marking a comment as resolved, redisplay comments.

In any of the foregoing aspects, the action in the activity data includes an indication of an end user that marked the comment as resolved.

In any of the foregoing aspects, the application is configured to provide a plurality of controls associated with displayed actions to allow filtering and sorting of actions.

In any of the foregoing aspects, the application is configured to filter actions by action type.

In any of the foregoing aspects, the application is configured to filter actions by user associated with the action.

In any of the foregoing aspects, the shared storage system is configured to update actions associated with the electronic document.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer, comprising:
a network interface configured to connect the computer to a computer network, the computer network being connected to a shared storage system, the shared storage system comprising a file system configured to store a plurality of electronic documents and to make the plurality of electronic documents available to a plurality of users; and
a processing system comprising one or more processing units and storage, the storage comprising computer program code that, when executed by the processing system, configures the processing system to comprise:
an application configured to process user input to modify an electronic document, wherein the electronic document has associated comment data and activity data,
wherein the comment data defines a collection of comments and comprises, for each comment, a reference to a location within the electronic document, data indicating a user that added the comment, and content of the comment, and
wherein the activity data defines a collection of actions and comprises, for each action, data indicating a type of action, and data indicating a user associated with the action, the application comprising a graphical user interface including:
  a document pane configured to display a graphical representation of the electronic document,
  a graphical representation of comments, displayed in association with the document pane, from the comment data associated with the electronic document, and
  a graphical representation of actions, displayed in association with the document pane, from the activity data associated with the electronic document;
the application being further configured to, in response to an input associated with a displayed comment, mark the comment as resolved by setting the value associated with the comment to indicate the comment is resolved and by adding an action to the activity data associated with the electronic document to indicate the comment is resolved; and
the application being further configured to, in response to an input associated with a displayed action related to a resolved comment, mark the comment as unresolved by setting the value associated with the resolved comment to indicate the comment is unresolved.

2. The computer of claim 1 wherein the application is configured to display a graphical representation of only unresolved comments.

3. The computer of claim 2 wherein the application is configured to, in response to marking a comment as resolved, redisplay the graphical representation of only the unresolved comments.

4. The computer of claim 1 wherein the action in the activity data includes an indication of an end user that marked the comment as resolved.

5. The computer of claim 1 wherein the application is configured to provide a plurality of controls associated with displayed actions to allow filtering and sorting of actions.

6. The computer of claim 5, wherein the application is configured to filter actions by action type.

7. The computer of claim 5, wherein the application is configured to filter actions by user associated with the action.

8. An article of manufacture comprising:
at least one computer storage medium,
computer program instructions stored on the at least one computer storage medium which, when processed by a processing system of a computer, the processing system comprising one or more processing units and storage, configures the computer to comprise:
a network interface configured to connect the computer to a
computer network, the computer network being connected to a shared storage system, the shared storage system comprising a file system configured to store a plurality of electronic documents and to make the plurality of electronic documents available to a plurality of users; and
a processing system comprising one or more processing units and storage, the storage comprising computer program code that, when executed by the processing system, configures the processing system to comprise:
an application configured to process user input to modify an electronic document, wherein the electronic document has associated comment data and activity data,
wherein the comment data defines a collection of comments and comprises, for each comment, a reference to a location within the electronic document, data indicating a user that added the comment, and content of the comment, and
wherein the activity data defines a collection of actions and comprises, for each action, data indicating a type of action, and data indicating a user associated with the action, the application comprising a user interface including:
  a first output configured to present a representation of the electronic document,
  a second output configured to present a representation of comments in association with the presentation of the electronic document, based on the comment data associated with the electronic document, and
  a third output configured to present a representation of actions in association with the presentation of the electronic document, based on the activity data associated with the electronic document;
the application being further configured to, in response to an input associated with a presented comment, mark the comment as resolved by setting the value associated with the comment to indicate the comment is resolved and by adding an action to the activity data associated with the electronic document to indicate the comment is resolved; and
the application being further configured to, in response to an input associated with a presented action related to a resolved comment, mark the comment as unresolved by setting the value associated with the resolved comment to indicate the comment is unresolved.

9. The article of manufacture of claim 8, wherein the application is configured to present a representation of only unresolved comments.

10. The article of manufacture of claim 9, wherein the application is configured to, in response to marking a comment as resolved, present an updated representation of only the unresolved comments.

11. The article of manufacture of claim 8, wherein the action in the activity data includes an indication of an end user that marked the comment as resolved.

12. The article of manufacture of claim 8, wherein the application is configured to provide a plurality of controls associated with the presented actions to allow filtering and sorting of actions.

13. The article of manufacture of claim 12, wherein the application is configured to filter actions by action type.

14. The article of manufacture of claim 12, wherein the application is configured to filter actions by user associated with the action.

15. A computer-implemented process comprising:
processing user input to modify an electronic document, wherein the electronic document has associated comment data and activity data, wherein the comment data defines a collection of comments and comprises, for each comment, a reference to a location within the electronic document, data indicating a user that added the comment, and content of the comment, and wherein the activity data defines a collection of actions and comprises, for each action, data indicating a type of action, and data indicating a user associated with the action,
presenting a graphical user interface including:
a document pane configured to display a graphical representation of the electronic document,
a graphical representation of comments, displayed in association with the document pane, based on the comment data associated with the electronic document, and
a graphical representation of actions, displayed in associated with the document pane, based on the activity data associated with the electronic document;
in response to an input associated with a displayed comment, marking the comment as resolved by setting the value associated with the comment to indicate the comment is resolved and by adding an action to the activity data associated with the electronic document to indicate the comment is resolved; and
in response to an input associated with a displayed action related to a resolved comment, marking the comment as unresolved by setting the value associated with the resolved comment to indicate the comment is unresolved.

16. The computer-implemented process of claim 15, wherein displaying comments comprises displaying a graphical representation of only unresolved comments.

17. The computer-implemented process of claim 16, further comprising, in response to marking a comment as resolved, redisplaying the graphical representation of only the unresolved comments.

18. The computer-implemented process of claim 15, wherein the action in the activity data includes an indication of an end user that marked the comment as resolved.

19. The computer-implemented process of claim 15, wherein the application is configured to provide a plurality of controls associated with displayed actions to allow filtering and sorting of actions.

20. The computer-implemented process of claim 19, wherein the application is configured to filter actions by action type.

* * * * *